United States Patent
Sanghavi et al.

(10) Patent No.: US 12,506,937 B2
(45) Date of Patent: Dec. 23, 2025

(54) CUSTOMIZATION OF MEDIA CONTENT WITH AN ANIMATED BACKGROUND

(71) Applicant: Roku, Inc., San Jose, CA (US)

(72) Inventors: Mehul Sanghavi, San Jose, CA (US); Michael Bruza, Los Gatos, CA (US); Saket Kumar, Fremont, CA (US); Matthieu Chamik, Sebastopol, CA (US)

(73) Assignee: Roku, Inc., San Jose, CA (US)

( * ) Notice: Subject to any disclaimer, the term of this patent is extended or adjusted under 35 U.S.C. 154(b) by 43 days.

(21) Appl. No.: 18/594,504

(22) Filed: Mar. 4, 2024

(65) Prior Publication Data
US 2025/0280182 A1 Sep. 4, 2025

(51) Int. Cl.
*H04N 21/81* (2011.01)
*H04N 21/44* (2011.01)
*H04N 21/458* (2011.01)

(52) U.S. Cl.
CPC ... *H04N 21/8146* (2013.01); *H04N 21/44016* (2013.01); *H04N 21/458* (2013.01); *H04N 21/812* (2013.01)

(58) Field of Classification Search
CPC ......... H04N 21/8146; H04N 21/44016; H04N 21/458; H04N 21/812
See application file for complete search history.

(56) References Cited

U.S. PATENT DOCUMENTS

| | | | |
|---|---|---|---|
| 2009/0100362 A1* | 4/2009 | Sauve | G06F 3/048 |
| 2011/0231265 A1 | 9/2011 | Brown et al. | |
| 2018/0160054 A1* | 6/2018 | Gandhi | H04N 5/2624 |
| 2018/0343491 A1 | 11/2018 | Loheide et al. | |
| 2022/0180898 A1 | 6/2022 | Ahmed et al. | |
| 2023/0017614 A1 | 1/2023 | Srinivasa et al. | |
| 2024/0404496 A1* | 12/2024 | O'Neil | H04N 21/4223 |

FOREIGN PATENT DOCUMENTS

| | | | | |
|---|---|---|---|---|
| CN | 116245985 A | * | 6/2023 | G06T 13/20 |
| WO | WO-2013136118 A1 | * | 9/2013 | G10L 15/142 |

OTHER PUBLICATIONS

Extended European Search Report dated Jun. 16, 2025, for the corresponding Application No. 25161226.3 in 10 pages.

* cited by examiner

*Primary Examiner* — Anthony Bantamoi
(74) *Attorney, Agent, or Firm* — Straylight LLP

(57) ABSTRACT

Aspects of the disclosed technology provide solutions for dynamically generating media content with an animated background based on contextual data. An example method can include receiving media content including a sequence of video frames. The method can include steps for determining a context associated with the media content and generating an animated background based on the context associated with the media content. In some examples, the animated background may include one or more items. The method can further include placing the media content within the animated background to generate a customized video for playback on a user device. Systems and machine-readable media are also provided.

20 Claims, 11 Drawing Sheets

CUSTOMIZATION OF MEDIA CONTENT WITH AN ANIMATED BACKGROUND

BACKGROUND

Field

This disclosure is generally directed to generating media content, and more particularly to dynamically generating media content with an animated background based on contextual data.

SUMMARY

Provided herein are system, apparatus, article of manufacture, method and/or computer program product embodiments, and/or combinations and sub-combinations thereof, for dynamically generating media content with an animated background based on contextual data.

In some aspects, a method is provided for dynamically generating media content with an animated background based on contextual data. The method may be implemented by content server(s) used to provide video content/media content to remote devices and/or by a media device(s) communicatively coupled to, for example, a display device. The method can operate in other devices such as, for example and without limitation, a smart television, computer, or a mobile device, among others.

The method can operate by receiving media content. The media content can include a sequence of video frames. The method can also include determining a context associated with the media content. Based on the context associated with the media content, an animated background can be generated. The background can include one or more customizable items. The media content can be placed within the animated background to generate a customized video for playback on a user device.

In some aspects, a system is provided for dynamically generating media content with an animated background based on contextual data. The system can include one or more memories and at least one processor coupled to at least one of the one or more memories and configured to receive media content. The media content can include a sequence of video frames. The at least one processor of the system can be configured to determine a context associated with the media content. Based on the context associated with the media content, an animated background can be generated. The background can include one or more customizable items. The at least one processor of the system can also be configured to place the media content within the animated background to generate a customized video for playback on a user device.

In some aspects, a non-transitory computer-readable medium is provided for dynamically generating media content with an animated background based on contextual data. The non-transitory computer-readable medium can have instructions stored thereon that, when executed by at least one computing device, cause the at least one computing device to receive media content. The media content can include a sequence of video frames. The instructions of the non-transitory computer-readable medium can, when executed by the at least one computing device, cause the at least one computing device to determine a context associated with the media content. Based on the context associated with the media content, an animated background can be generated. The background can include one or more customizable items. The instructions of the non-transitory computer-readable medium also can, when executed by the at least one computing device, cause the at least one computing device to place the media content within the animated background to generate a customized video for playback on a user device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
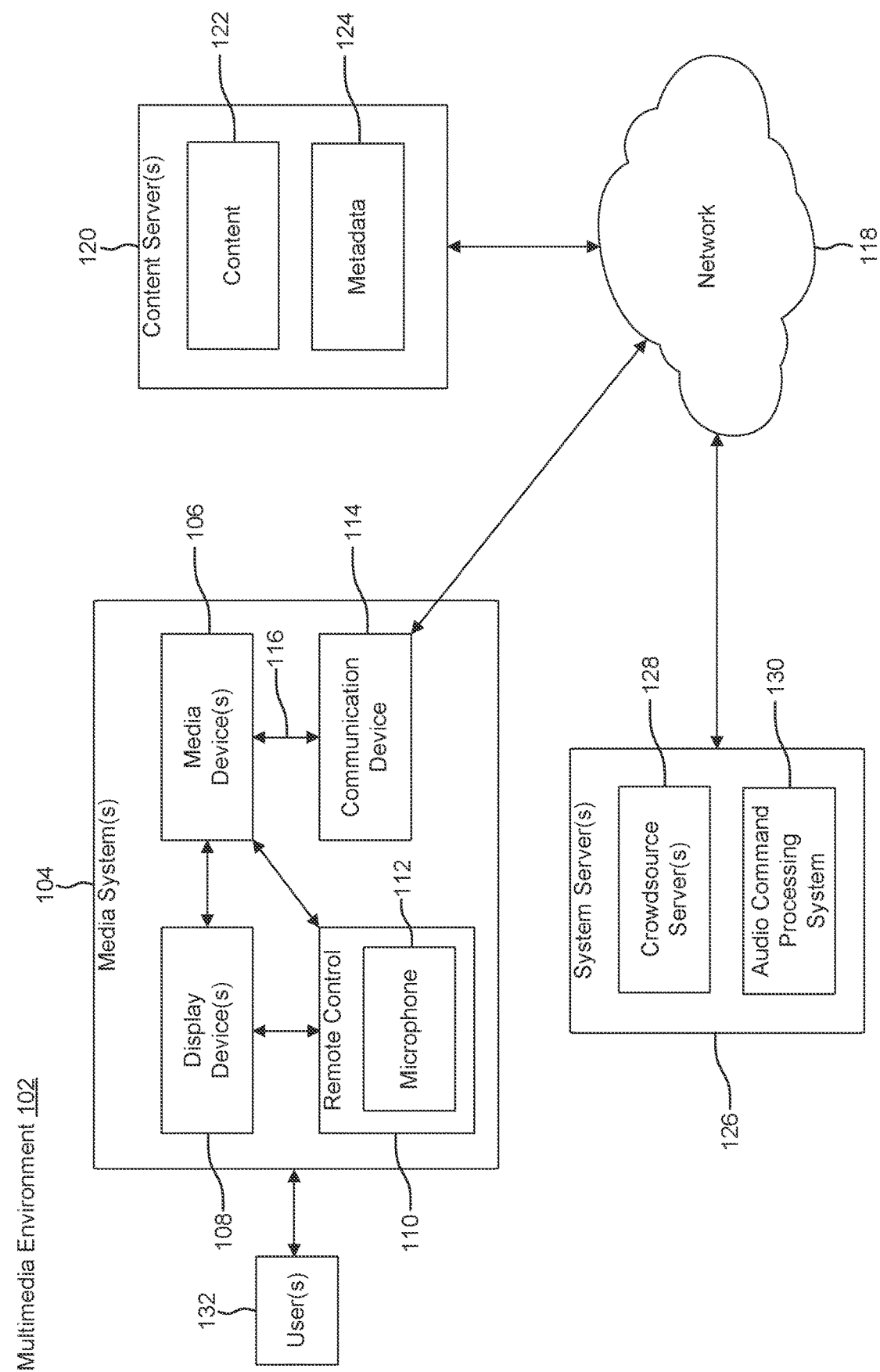
FIG. 1 illustrates a block diagram of an example multimedia environment, according to some examples of the present disclosure.

Users access and consume media content such as videos, at any time of day or any location, using a wide variety of client devices such as, for example, and without limitations, smart phones, desktop computers, laptop computers, laptop computers, televisions (TVs), among others. The media content can include advertisements that depict, describe, announce, promote, identify, and/or relate to a product(s), a service(s), a brand(s), an event(s), a message(s), and/or any other item. Such media content may be accessible on various platforms across diverse channels by a wide range of viewers.

More specifically, interstitials (also referred to as interstitial ads or interstitial advertisements) are a type of advertising format that appears between two content pages, typically as a full-screen overlay or pop-up window. The interstitials are displayed to users during natural breaks in content transitions and/or in the flow of their interaction with a website or mobile app, such as while waiting for a page to load, or when transitioning between different sections of an app. While interstitials can be effective in reaching a wide audience and driving conversions, they can also be perceived as intrusive or disruptive as users are required to wait for the interstitials to complete before resuming the user journey. Also, the lack of user context in interstitials leads to users who are unlikely to be interested or receptive, and therefore, irrelevant content is more likely to be ignored or viewed negatively by users.

Aspects of the disclosed technology provide solutions for dynamically generating media content with an animated background based on contextual data (e.g., contextual information derived from media content and/or user profile). In some aspects, a system (e.g., one or more content servers) can determine a context associated with media content and/or user profile and use the contextual information to generate an animated background. For example, based on the analysis of the media content and/or user profile, a customized animated background for the media content can be generated. As such, the animated background can be thematically linked to the media content and/or user profile, thereby linking the user experience (e.g., advertisement experience) to the user in a personalized way. In some examples, a system such as a content server(s) can place the media content within the animated background to generate a customized video for playback on a user device.

In some implementations, machine learning techniques can be used to analyze media content and/or user profile and generate an output (e.g., a customized video that includes media content wrapped in an animated background) based on contextual information derived from media content and/or user profile. Additionally, machine learning techniques can be used to generate one or more customizable items that can be placed within an animated background based on user profile such that the background is personalized to a particular user.

As discussed in further detail below, the technologies and techniques described herein can significantly improve user experience by providing solutions for dynamically generating customized media content with an animated background. Furthermore, the time and effort expended by human editors can be significantly reduced by providing solutions for automatically generating an animated background that is tailored to users' preferences and improving the user experience.

Various embodiments and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, audio, videos, movies, TV programs, multimedia, images, still pictures, text, graphics, gaming applications, advertisements, programming content, public service content, government content, local community content, software, recording or live feed from a surveillance and security system, and/or any other content or data objects in electronic form.

As previously described, content 122 may include any type of media content that promotes or is otherwise associated with a product, service, business, brand, and/or event. In some configurations, content 122 may include interstitials (also referred to as interstitial advertisements, interstitial ads) to be displayed between two content pages on a device (e.g., display device 108, media device 106, user device, client device, etc.).

In some examples, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

In some cases, metadata 124 comprises information relating to a source identifier associated with content 122. For example, a source identifier can include a business, a service provider, supplier, manufacturer, an entity, or an individual that is associated with content 122 that promotes, depicts, describes, announces, identifies, and/or is related to a product(s), a service(s), a brand(s), an event(s), a message(s), and/or any other item.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing system 130. As noted above, the remote control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126. The audio command processing system 130 may operate to process and analyze the received audio data to recognize the user 132's verbal command. The audio command processing system 130 may then forward the verbal command back to the media device 106 for processing.

Figure 2:
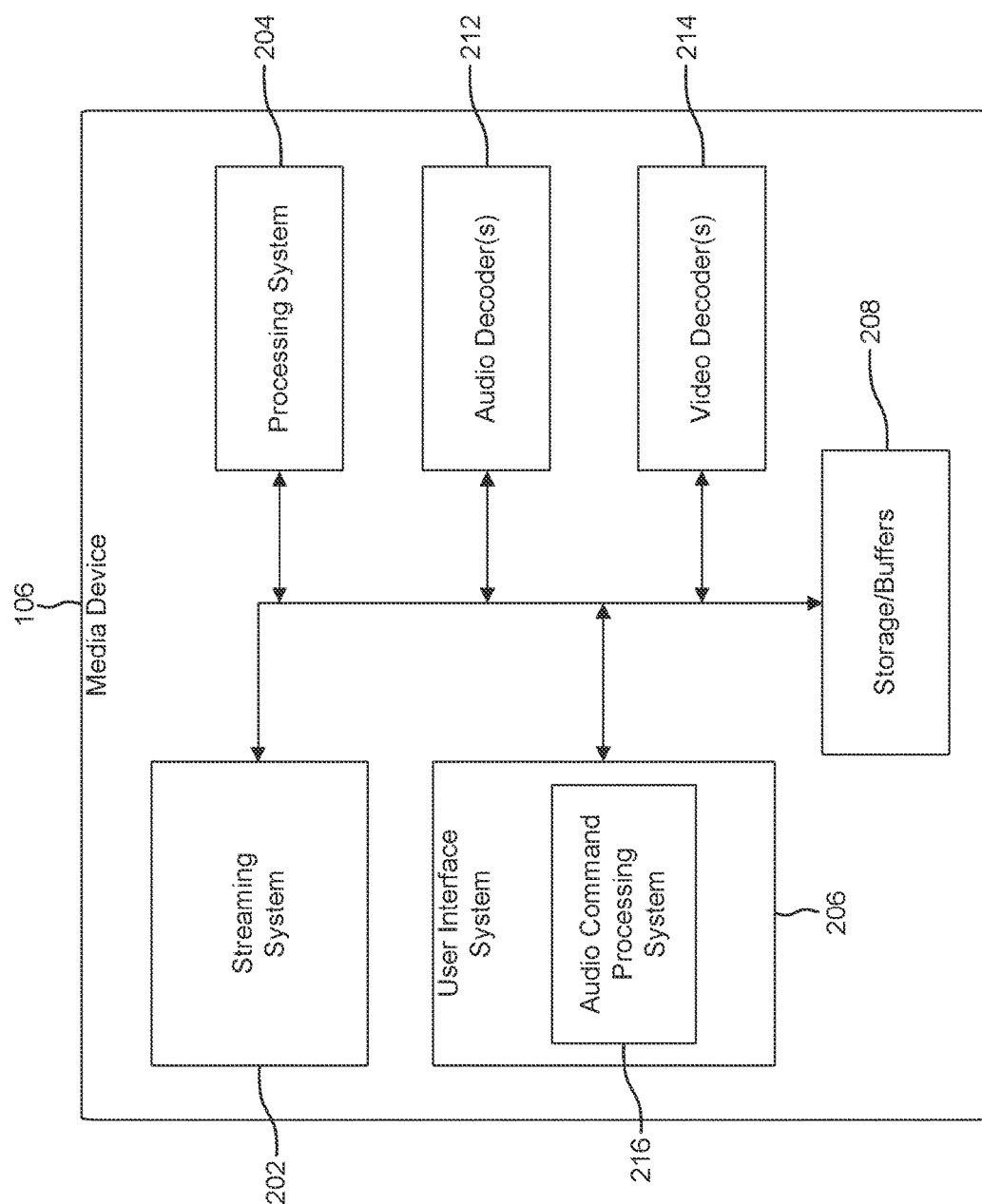
FIG. 2 illustrates a block diagram of an example streaming media device, according to some examples of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some embodiments. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, VVC, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, VVC, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Customization of Media Content with an Animated Background

Referring to FIG. 1, content server(s) 120 and/or media system 104 can be configured to perform applicable functions related to determining contextual information from media content (e.g., content 122). For example, content server(s) 120 and/or the media system 104 can be configured to analyze and/or evaluate content 122 and/or metadata 124 to determine contextual information such as a type and/or genre of content, a type of scene, a background and/or setting, any activity and/or events, an actor(s), demographic information, a mood and/or sentiment, a type of audio or lack thereof, any objects, noise levels, a landmark and/or architecture, a geographic location, a keyword, a message, a type of encoding, a time and/or date, any other characteristics associated with content 122.

In some aspects, content server(s) 120 and/or media system 104 can use user profile or user profile information to determine contextual information associated with media content (e.g., content 122). For example, content server(s) 120 and/or media system 104 can determine contextual information associated with content 122 based on use profile information such as user demographics (e.g., age, sex, geographic location, income, generation, occupation, etc.), user preferences (e.g., likes and/or dislikes), geographic location, privacy settings, viewing history, and so on.

In some examples, content server(s) 120 and/or media system 104 can generate an animated background based on the contextual information derived from media content (e.g., content 122) and/or user profile. For example, content server(s) 120 and/or media system 104 can generate, based on the contextual information associated with content 122 and/or user profile, dynamic visuals or motion graphics that may include subtle movements such as gently moving particles, flowing lines, or changing colors, or animations/animated illustrations. As follows, the animated background can be tailored to a particular content or convey a certain mood or atmosphere to create an engaging and immersive user experience. In some aspects, media content (e.g., content 122) can be wrapped in the animated background to generate a customized video (e.g., interstitials) such that the customized video can be displayed on a device that is associated with a target audience of the media content.

In some examples, content server(s) 120 or the media device(s) 106 can use an algorithm, such as a machine learning algorithm, to generate an animated background that is relevant to content 122. The relevancy can be based on the contextual information derived from content 122, metadata 124, and/or user profile. For example, the relevancy can be determined by various parameters associated with content 124 and/or user profile information such as a type of content 124, an item that is promoted or identified in content 124, demographics of a user or a target audience, user preferences, viewing history, and so on.

Non-limiting examples of contextual information to determine the relevancy can further include information indicating or related to writer, director, producer, composer, artist, actor, summary, chapters, production, history, year, trailers, alternate versions, information relating to a source identifier associated with content 122 (e.g., a business, a service provider, supplier, manufacturer, an entity, or an individual that is associated with content 122 that promotes, depicts, describes, announces, identifies, and/or is related to a product, a service, a brand, an event, a message, and/or any other item), and/or user profile information such as user demographics, user preferences, geographic location, privacy settings, viewing history, and so on.

Additionally, the relevancy can be based on data outside of a user profile. That is, the contextual information for generating an animated background can also be derived from data outside of a user profile. For example, if content 122 includes an advertisement from Restaurant A, an animated background, for example for user B, can have a restaurant setting (e.g., similar to Restaurant A) and include fixed placements that can cycle through various product placements that have resonated with other users. In some examples, existing campaign data can be leveraged to power/improve user's experience by generating a version of the animation that has worked well with other users. For example, if a number of users that had engaged with product placements, via CTAs, is above a threshold, it can be determined that such product placements have worked well with users and can be used for generating a new animated background or being placed in a new animated background. In some aspects, an animated background can show the name of the street and/or cross-roads where the user B's nearest local Restaurant A is located. The animated background can also factor in local points of interest (POIs) that are landmarks in the user B's neighborhood using geo-targeting data.

Figure 3:
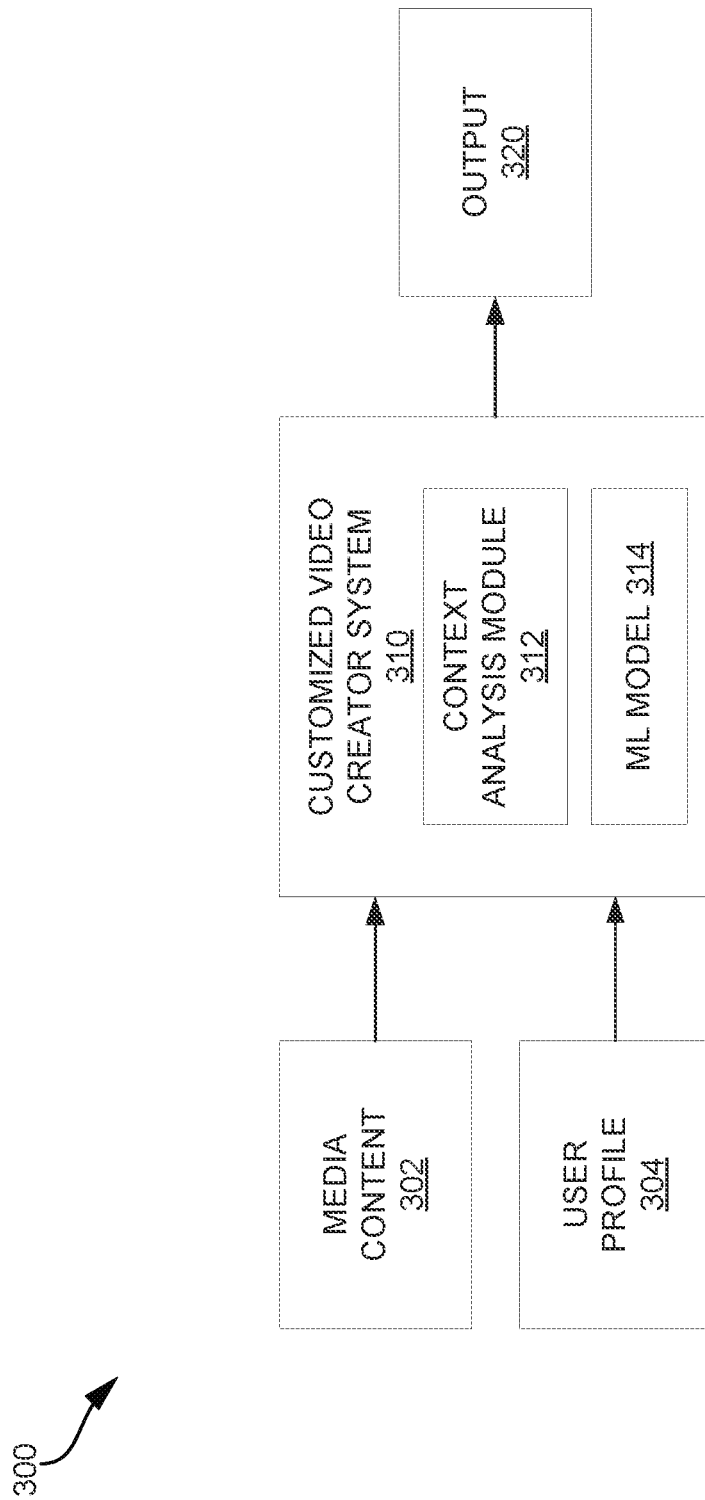
FIG. 3 illustrates an example system for dynamically generating media content based on contextual data, according to some examples of the present disclosure.

The disclosure now continues with a further discussion of dynamically generating media content. Specifically, FIG. 3 is an example system 300 for dynamically generating media content with an animated background based on contextual data. The system 300 includes media content 302, user profile 304, and customized video creator system 310. The system 300 functions to determine contextual information based on media content 302 and/or user profile 304 to generate output 320 (e.g., a customized video, which includes media content within an animated background).

The various components of system 300 can be implemented at applicable places in the multimedia environment 102 shown in FIG. 1. Specifically, media content 302 can reside at the content server(s) 120. Further, media content 302 can reside at media system 104 as part of reproducing media content 302 or placing media content 302 within a customized background for user 132. Furthermore, customized video creator system 310 can reside at media system 104, system servers 126, content server(s) 120, or a combination thereof.

The customized video creator system 310 functions to receive media content 302, which may correspond to content 122 illustrated in FIG. 1. Non-limiting examples of media content 302 can include music, videos, movies, TV programs, multimedia, images, still pictures, text, graphics, gaming applications, targeted content, programming content, public service content, government content, local community content, software, and/or any other content or data objects in electronic form.

In some aspects, media content 302 can include one or more video frames (e.g., a plurality of video frames or a sequence of video frames) depicting, describing, announcing, promoting, identifying, and/or related to a product(s), a brand(s), an event(s), a message(s), an object(s), a service(s), and/or any other item. For example, media content 302 can be a commercial advertisement for a film, a show, etc. such as a trailer or a preview.

In some examples, media content 302 may include content metadata (e.g., metadata 124 as illustrated in FIG. 1) or information about the media content 302 such as a type and/or genre of media content 302, a type of scene (e.g., a scenic scene, a sports scene, a scene with dialogue, a slow or fast scene, an indoors scene, an outdoor scene, a city scene, a rural scene, a holiday scene, a vacation scene, a scene with certain weather, a scene with a certain amount of lighting, and/or any other scene), a background and/or setting depicted in media content 302, a geographic location depicted or described in media content 302, any activity and/or events depicted in media content 302, an actor(s) included in media content 302, a mood and/or sentiment associated with media content 302, a type of audio (e.g., dialogue, music, noise, certain sounds, etc.) or lack thereof, any objects included in media content 302, a landmark and/or architecture depicted or described in media content 302, a message conveyed in media content 302, a time and/or date associated with media content 302, one or more characteristics of media content 302, and/or any other information associated with media content 302.

In some illustrations, media content 302 may include information associated with a source identifier or advertiser data. For example, as previously described, media content 302 may include an advertisement and further include advertiser data, which may include a business name, a brand name, a type of business or industry, a logo, contact information such as phone number, email address, business location, a style or image that the advertisement is promoting, etc., advertisement history, marketplaces, and so on.

The customized video creator system 310 also functions to receive user profile 304 (e.g., user profile information, target audience data, etc.). For example, customized video creator system 310 can receive user profile 304, which may include any information associated with user(s) 132 or target audience who may be viewing media content 302. Non-limiting examples of user profile information (or target audience data) can include user demographics (e.g., age, sex, geographic location, income, generation, occupation, etc.), user preferences (e.g., likes and/or dislikes), a geographic region or location of viewer or a location for streaming media content 302, privacy settings, viewing history, search history, social media data, and so on.

The context analysis module 312 may analyze or evaluate media content 302 and/or user profile 304 to determine contextual information, which may include any information associated with media content 302 and/or user profile 304 such as semantic information, descriptive information, extracted features, sentiment/mood information, content information, and so on. For example, the context analysis module 312 can perform analysis on media content 302 and/or user profile 304 to determine additional information about media content 302 and/or user profile 304 to better contextualize and/or identify the content in media content 302.

In one illustrative example, contextual information derived from media content 302 can include an activity type (e.g., eating, sitting, talking, arguing, etc.), location (e.g., inside of a restaurant), identity of an actor(s), demographic information of the actor(s), type of food/drink on table, brands of products that appear in media content 302 (e.g., clothes, beverages, glassware, etc.), a business or an entity that is promoting or related to a product(s), a service(s), a brand(s), an event(s), a message(s), and/or any other item in media content 302, lighting conditions (e.g., dark, bright, etc.), weather conditions, mood or sentiment, language, accent, sound, dialogue, keyword, etc.

In some aspects, context analysis module 312 can be implemented as part of a server (e.g., content server(s) 120 and/or system server(s) 126), as part of a media device (e.g., media device(s) 106), and/or as part of cloud computing resources that may be associated with a network such as network 118.

The customized video creator system 310 can include an ML model 314 for generating an animated background based on the contextual information derived from media content 302 and/or user profile 304. That is, customized video creator system 310 can be an applicable machine learning-based technique for generating, based on the analysis of media content 302 and/or user profile 304, an animated background such that media content 302 can be placed within the animated background for display on a user device. The ML model 314 can include any neural network configured to dynamically generate an animated background based on the analysis of media content 302 and user profile 304. For example, in some cases, ML model 314 (e.g., neural network) can include a convolutional neural network (CNN), hidden Markov models; Recurrent Neural Network (RNN), deep learning, and Generative Adversarial Network (GAN), among others.

In some aspects, ML model 314, for generating an animated background, can use user-specific propensities to drive forward a target action. For example, if media content 302 includes a McDonalds campaign, Performance Optimization (PO) models can help determine which action a user (e.g., user 132) is most likely to take in terms of a conversion. Non-limiting examples of actions that a user may take include placing an order from the user's device, use of a coupon or code, getting directions to a local store, use of a QR code to download a mobile app, and so on. Depending on the PO score of the user, the animated background can surface a targeted call-to-action (CTA) that is most likely to get a conversion (e.g., most likely to cause the user to engage and take action). Alternatively, an exploration/exploitation method can be used to model out several CTAs and aim to figure out which action or what works best for the user. While this data may not be usable for the immediate campaign or advertisement, it can be used for the next campaign or advertisement the user gets to see on his/her device.

In some aspects, a device that displays content 302 and/or output 320 (e.g., display device 108, media device 106, etc.) can use audio, visual, and/or user-directed signaling to check which other users may be present in a room. If the device has user profiles for each of those users, then user profile 304 that is provided to customized video creator system 310 can be a combination of multiple user profiles. This can help with age-appropriate content or animated background selection, especially if there is a child in the room.

The customized video creator system 310 or ML model 314 may generate output 320, which is a customized video that includes media content 302 with an animated background. That is, customized video creator system 310 or ML model 314 can generate a customized animated background that is tailored to a particular media content 302 and/or user (or a target audience) for media content 302 to be displayed. As previously described, the animated background can include dynamic visuals or motion graphics that may include subtle movements such as gently moving particles, flowing lines, or changing colors, or animations/animated illustrations.

In some illustrations, output 320 can include an animated background associated with content of media content 302. For example, if media content 302 includes an upcoming movie trailer, the animated background can be in a drive-in movie theater where a screen shows media content 302.

In some aspects, output 320 can include an animated background with one or more items that are associated with media content 302 and/or user profile 304. For example, an animated background can drop in props or movie references based on what a user (e.g., user 132) has recently watched (e.g., main character silhouettes in the window, accessories or clothing items that main characters were wearing, etc.). In another example, an animated background can be set in a location where media content 302 is filmed, a geographic location of a user, or a target location for streaming media content 302, etc. In another example, an animated background can have a weather condition (e.g., rain, snow, etc.) that is similar to one in user's location, or as depicted in media content 302.

In some cases, output 320 can be provided to a user device for playback (e.g., display device 108, media device 106, user device, client device, etc.). For example, output 320 can be displayed, played, or presented, on a user device at one or more key ingress points such as device boot, device resume, or exiting the screensaver. The animated background that is customized based on media content 302 and/or user profile 304 can improve the user experience by adding an engaging and personalized outlook to media content 302.

In some examples, output 320 (e.g., a customized video, interstitial units) can be gated by campaign-level frequency capping and/or placement-level frequency capping. The campaign level caps can be automatically handled via an advertisement server (e.g., content server(s) 120, system server(s) 126, etc.) The placement-level caps can be enforced by user(s) 132.

In some examples, customized video creator system 310 can be part of or implemented by content server(s) 120 illustrated in FIG. 1. For example, customized video creator system 310 can be a software algorithm running on content server(s) 120. In other words, customized video creator system 310 can be separate from content server(s) 120. For example, customized video creator system 310 can be or can be implemented by a different server(s), a datacenter, a software container hosted on a different system (e.g., a server(s), a cloud system, an on-premises system, etc.), a virtual machine hosted on a different system (e.g., a server(s), a cloud system, an on-premises system, etc.), a software service hosted on a distributed system, or any other system.

Figure 4:
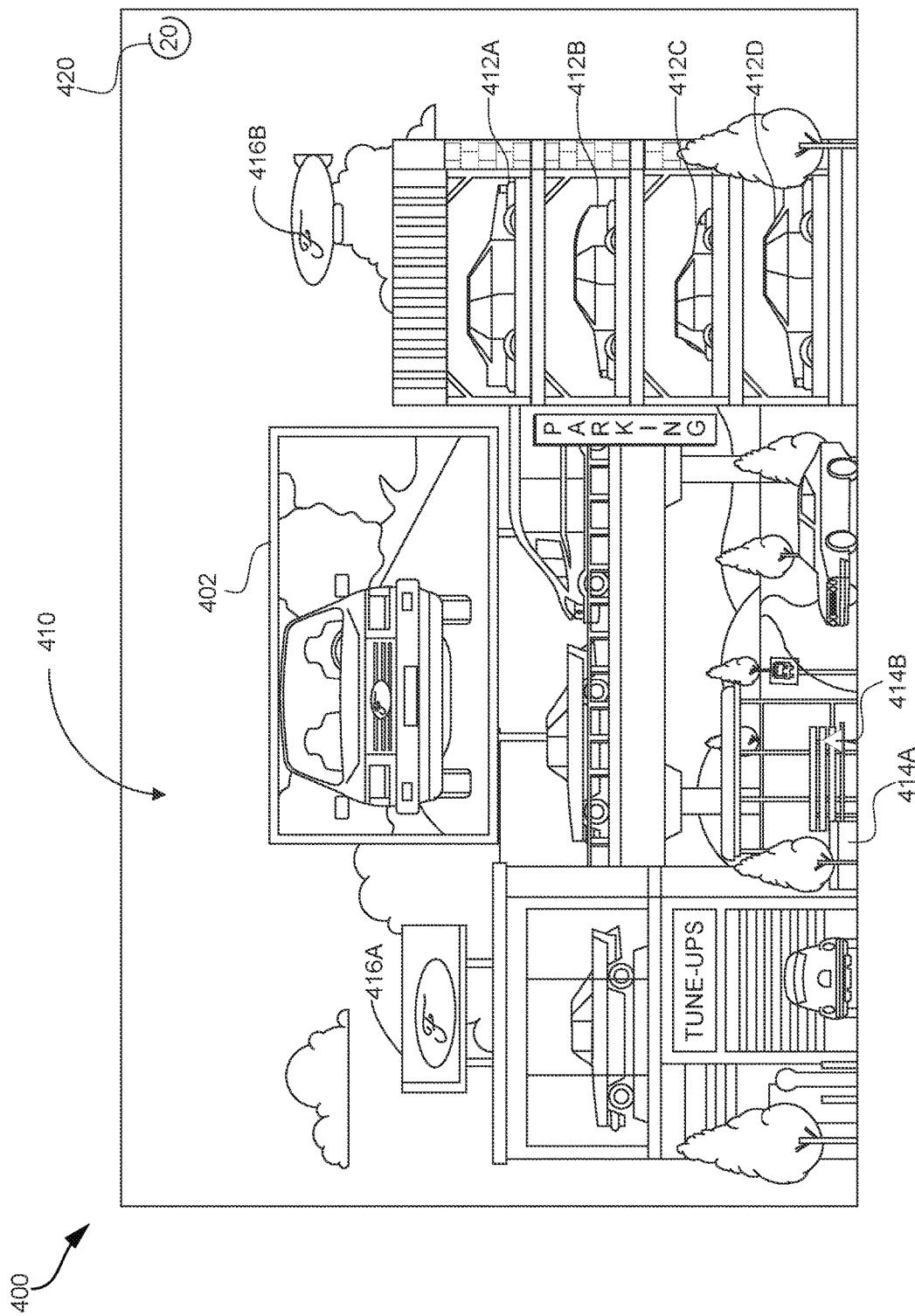
FIG. 4 illustrates an example representation of media content with an animated background, according to some examples of the present disclosure.

FIG. 4 illustrates an example representation 400 of media content with an animated background, according to some examples of the present disclosure. For example, representation 400 can be an interstitial that includes media content 402 with animated background 410. As an illustrative example, media content 402 is an advertisement for a vehicle that is provided by an automobile manufacturer. For example, media content 402 may include a plurality of video frames for advertising a new model that is released by the automobile manufacturer.

The animated background that encapsulates media content 402 can be generated or selected based on a type of advertisement, content of the advertisement, an advertiser, and/or target audience. For example, the animated background shows a parking garage where several vehicles 412A-D are parked. The vehicles 412A-D can be the same model as shown in media content 402. Or, vehicles 412A-D can be different models from the same automobile manufacturer as the one from media content 402. Alternatively, vehicles 412A-D can be determined based on demographics of target audience (e.g., age, sex, geographic location, income, generation, occupation, etc.), viewing history of user (e.g., vehicles that appeared in TV shows or movies that the user recently watched, etc.), and so on.

Additionally, the animated background can include various elements or items that are related to media content 402 and/or user profile information (e.g., user profile 304 as illustrated in FIG. 3). For example, movie references 414A and 414B from user's viewing history can be added in the animated background. Also, billboard 416A and blimp 416B can show the automobile manufacturer's logo as appeared in media content 402.

In some aspects, animated background 410 can display a countdown timer 420 for media content 402. For example, as media content 402 plays, countdown timer 420 can show the amount of time (e.g., in seconds, in minutes, etc.) that is left for media content 402 to be played. When playback for media content 402 is completed, countdown timer 420 reaches zero.

Figure 5:
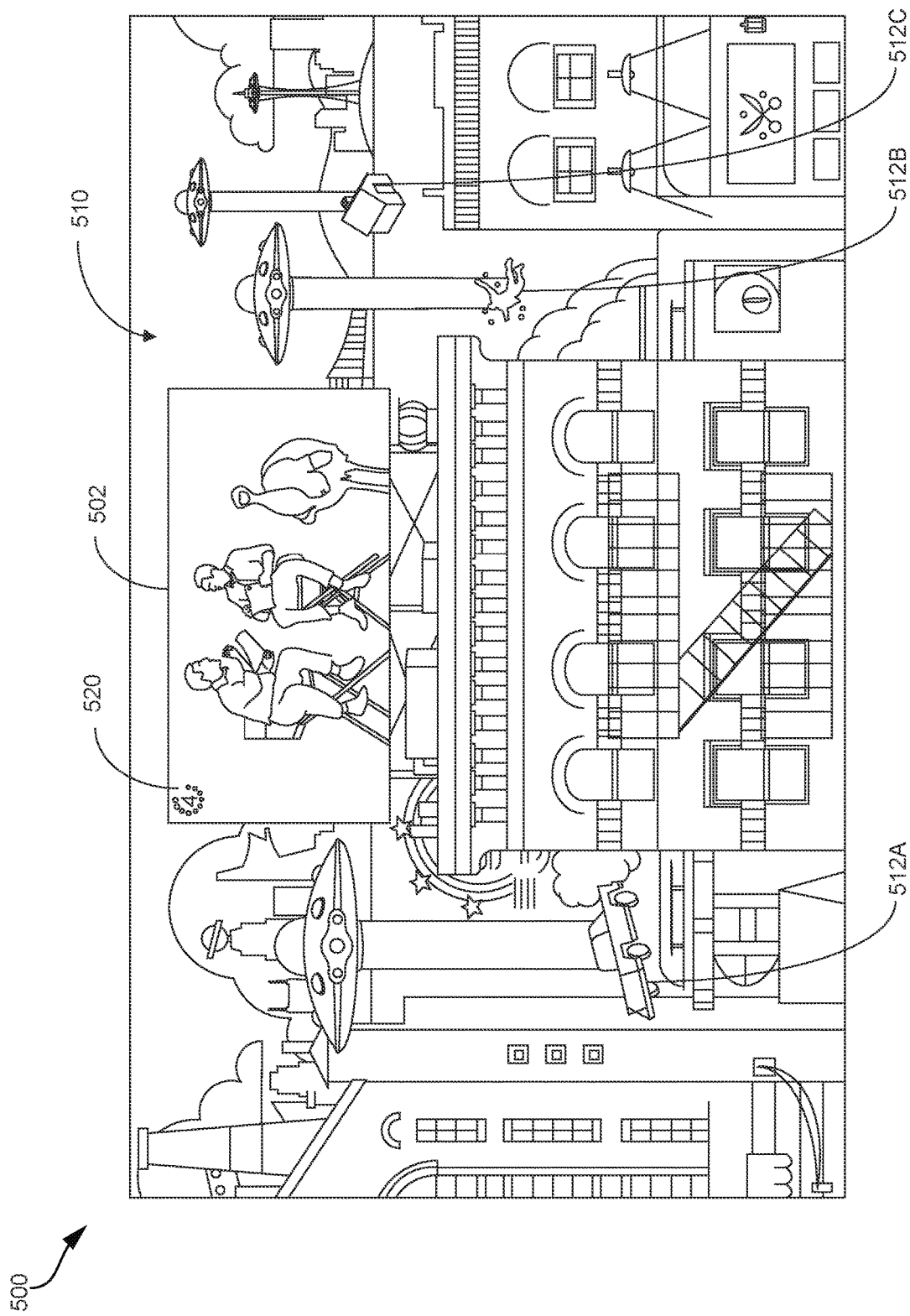
FIG. 5 illustrates another example representation of media content with an animated background, according to some examples of the present disclosure.

FIG. 5 illustrates another example representation 500 of media content with an animated background, according to some examples of the present disclosure. For example, interstitial representation 500 can include media content 502 with animated background 510. As an illustrative example, media content 502 is an advertisement from an insurance company (e.g., insurance ad campaigns, insurance commercials) that promotes, introduces, and/or identifies insurance policies.

As illustrated, media content 502 is encapsulated or placed within animated background 510, which is generated or selected based on various parameters associated with media content 502 and/or user profile (e.g., contextual information derived from media content and/or user profile). For example, customized video creator system 310 or context analysis module 312 as illustrated in FIG. 3 can identify a type of advertisement, content of the advertisement, an advertiser and any information associated with the advertiser, and/or target audience and any information associated with the target audience.

For example, the animated background can have a theme that is similar to a TV show or movie that user or target audience has watched, has added to a to-watch list, or has liked. Also, the animated background can include one or more elements that are associated with media content 502 or a provider of media content 502. For example, automobile 512A, person 512B, and house 512C may indicate various areas/types of what is covered by the insurance company. When a user moves or hovers a pointer over to automobile 512A, person 512B, and house 512C, relevant information about the respective policy can be presented. In another example, automobile 512A, person 512B, and house 512C can include a link or address (e.g., uniform resource location (URL)) associated with the respective insurance policy. For example, when a user clicks on automobile 512A, person 512B, or house 512C, the user can be directed to a webpage that provides details of the respective insurance policy.

In some aspects, a countdown timer 520 can be displayed within media content 502 to indicate an amount of time until playback of media content 502 is completed. In some examples, when countdown timer 520 reaches zero or expires, the size of media content 502 can be adjusted or playback button can appear on the animated background such that a user can replay media content 502 if desired.

Figure 6:
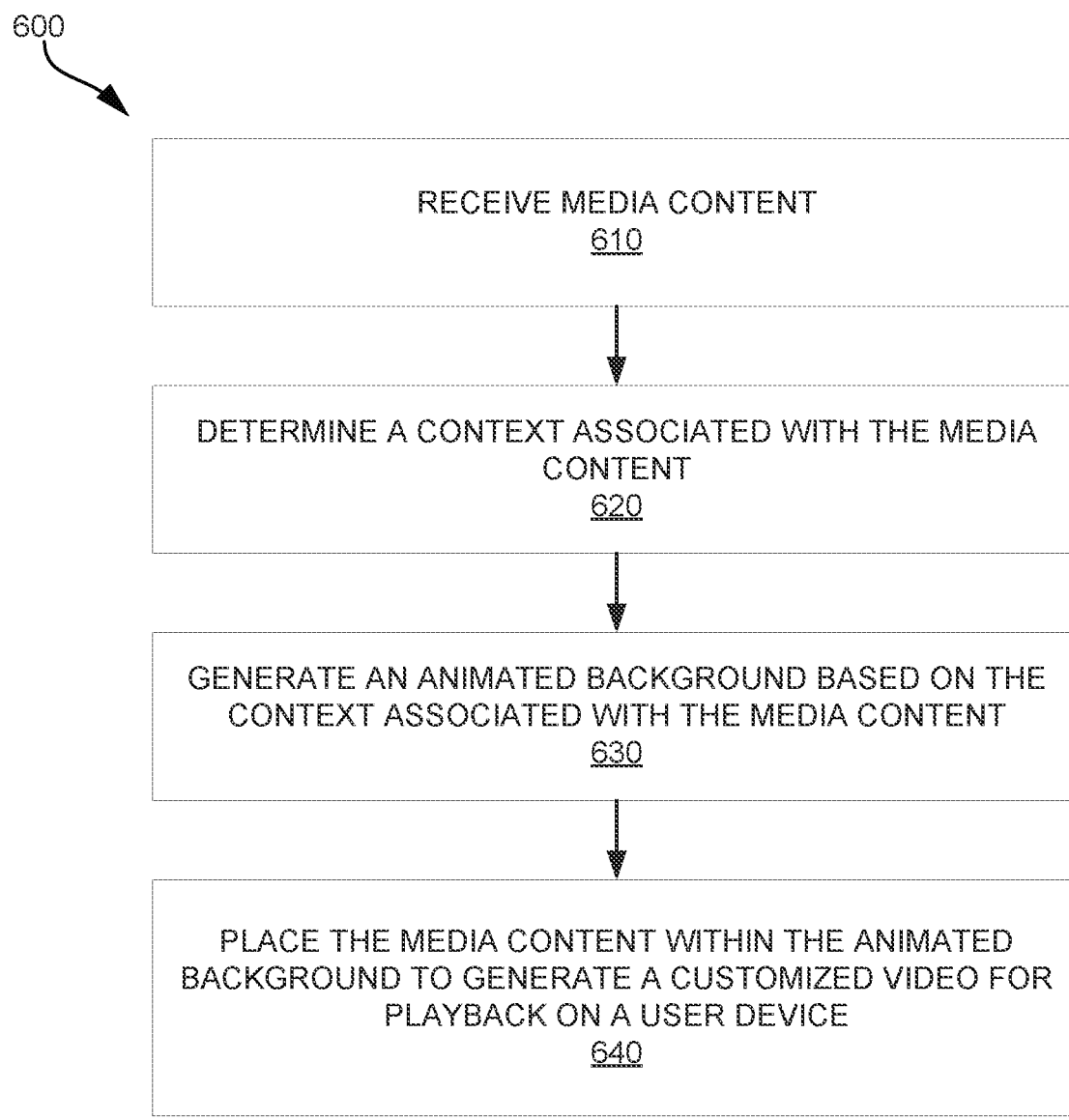
FIG. 6 illustrates a flowchart of an example method for dynamically generating media content with an animated background based on contextual data, according to some examples of the present disclosure.

FIG. 6 is a diagram illustrating a flowchart of an example method 600 for dynamically generating media content with an animated background based on contextual data, according to some examples of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 3. However, method 600 is not limited to that example.

In step 610, method 600 includes receiving media content. For example, customized video creator system 310 can receive media content (e.g., content 122, media content 302, media content 402, media content 502, etc.). In some aspects, customized video creator system 310 can receive media content from a content server (e.g., content server(s) 120 over network 118).

The media content may include a sequence of frames such as a continuous sequence of video frames. In some cases, the media content can include an advertisement that may depict, describe, announce, promote, identify, and/or be related to a product(s), a service(s), a brand(s), an event(s), a message(s), and/or any other item. For example, media content 402 includes an advertisement for a vehicle that is provided by a vehicle manufacturer. The media content 502 includes an advertisement for an insurance company.

Further, method 600 includes receiving user profile (or user profile information). For example, customized video creator system 310 can receive user profile 304, which includes information associated with user(s) 132, viewer(s), and/or target audience of media content 302. As previously described, user profile information can include user demographics (e.g., age, sex, geographic location, income, generation, occupation, etc.), user preferences (e.g., likes and/or dislikes), geographic region or location of viewer or a location for streaming media content, privacy settings, viewing history, search history, social media data, and so on.

In step 620, method 600 includes determining a context associated with the media content. For example, customized video creator system 310 may determine a context associated with media content 302. The customized video creator system 310 may analyze and evaluate various parameters associated with media content 302 to determine a context associated with media content 302 (e.g., contextual information relating to media content 302).

Non-limiting examples of parameters that can be considered may include a type and/or genre of content (e.g., advertisement), a type of product, service, a brand that media content is promoting, a type of scene, a background and/or setting, any activity and/or events, an actor(s), a mood and/or sentiment, a type of audio (e.g., dialogue, music, noise, certain sounds, etc.) or lack thereof, any objects (e.g., a product and/or brand, device, structure, tool, toy, vehicle, etc.), environment/place/location of the scene, a landmark and/or architecture, a geographic location, a keyword, a message, a time and/or date, any other characteristics associated with media content 302, and/or any combination thereof. In some aspects, the customized video creator system 310 may evaluate each of the plurality of video frames of media content 302 to determine the contextual information as described above.

In some examples, a length of an animated background or a playback speed of the animated background can be a controllable attribute/variable. For example, user A's animated background can be longer than user B's animated background. That is, a longer-form animation can play for user A while a short-form animation can be played for user B. In another example, user A's animated background may play faster than user B's animated background. The length and/or speed of an animated background can be controlled so that additional or fewer artifacts or elements can be displayed depending on the user profile.

Additionally, when the media content includes advertisement (e.g., interstitials, etc.), customized video creator system 310 may identify and determine a type of advertisement, a date of providing the advertisement, a location of providing the advertisement, a time of an advertisement notification, and so on. Further, customized video creator system can analyze and/or evaluate parameters associated with a source identifier such as a type of product, service, business, or brand that media content 302 is identifying, depicting, or promoting, or any other details of the advertisement or the advertiser.

In step 630, method 600 includes generating an animated background based on the context associated with the media content. For example, customized video creator system 310 can generate an animated background based on the context or contextual information associated with media content 302 (e.g., information derived from the analysis of media content 302 in step 620). That is, customized video creator system 310 can dynamically generate an animated background that is media content-specific, advertiser-specific, and/or user-specific. For example, media content would have a different animated background depending on a location, date, time, or any other condition for streaming the media content, or for different users.

In some aspects, the animated background can include one or more customizable items or elements that are associated with media content and/or user profile. For example, the animated background can include a barcode, a QR code, a call-to-action element, a logo, a coupon associated with media content presented within the animated background, an URL associated with the media content, and so on. Such items can encourage user interaction or user engagement and improve the user experience.

In step 640, method 600 includes placing the media content within the animated background to generate a customized video for playback on a user device. For example, customized video creator system 310 can place media content 302 within the animated background to generate a customized video for playback on a user device (e.g., media device 106 or a device associated with user 132).

Figure 7:
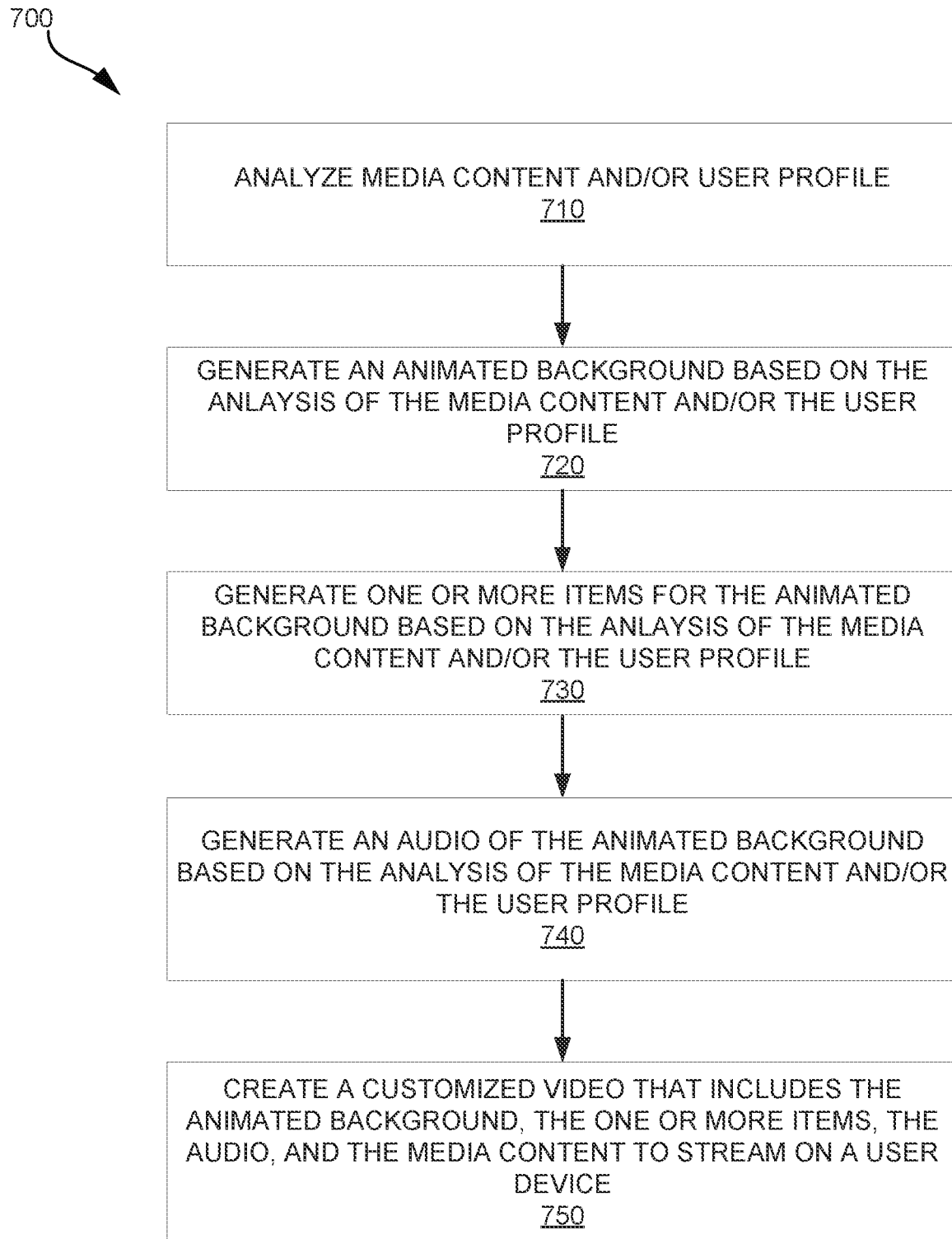
FIG. 7 illustrates a flowchart of an example method for dynamically generating media content with an animated background based on contextual data, according to some examples of the present disclosure.

FIG. 7 is a diagram illustrating a flowchart of an example method 700 for dynamically generating media content with an animated background based on contextual data. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 3. However, method 700 is not limited to that example.

In step 710, method 700 includes analyzing media content and/or user profile. For example, customized video creator system 310 may receive and analyze media content 302 and/or user profile 304 to determine contextual information associated with media content 302. The analyzed contextual information can include a type and/or genre of content, a type of product, service, a brand that media content is promoting, a type of scene, a background and/or setting, any activity and/or events, an actor(s), a mood and/or sentiment, a type of audio (e.g., dialogue, music, noise, certain sounds, etc.) or lack thereof, any objects (e.g., a product and/or brand, a device, a structure, a tool, a toy, a vehicle, etc.), environment/place/location of the scene, a landmark and/or architecture, a geographic location, a keyword, a message, a time and/or date, any other characteristics associated with media content 302, and/or any combination thereof.

In step 720, method 700 includes generating an animated background based on the analysis of the media content and/or the user profile. For example, customized video creator system 310 may generate, using a ML model (e.g., ML model 314), an animated background (e.g., animated background 410 or 510, etc.) that may play before, during, and/or after playing media content 302. For example, the animated background can include dynamic visuals or motion graphics that may include subtle movements such as gently moving particles, flowing lines, or changing colors, or animations/animated illustrations that are tailored to a particular content or convey a certain mood or atmosphere to create an engaging user experience for a user. In some cases, media content can be placed at the center of the animated background or any applicable place within the animated background as shown in FIGS. 4 and 5.

In step 730, method 700 includes generating one or more items for the animated background based on the analysis of the media content and/or the user profile. For example, customized video creator system 310 may generate, using a ML model (e.g., ML model 314), various items (e.g., vehicles 412A-D, movie references 414A and 414B, billboard 416A and blimp 416B, automobile 512A, person 512B, and house 512C, etc.) that are generated based on the contextual information derived from media content 302 and/or user profile 304.

In some aspects, such customizable items can include a barcode, a QR code, a call-to-action element, a logo, a coupon associated with media content presented within the animated background, an URL associated with the media content, and so on. For example, a user moves a pointer over to or click on those items, relevant information about media content (e.g., a product, services, a brand, or an event that is promoted or depicted in media content, etc.) can be presented. In another example, such items can include a link or address (e.g., URL) associated with media content (a product, services, a brand, or an event that is promoted or depicted in media content, etc.). For example, when a user clicks on those items, the user can be directed to a webpage that provides details of what is advertised in media content (e.g., a webpage where a promoted product can be purchased, or a link where a movie ticket can be reserved/purchased, or a business homepage of an advertiser).

In step 740, method 700 includes generating audio for the animated background based on the analysis of the media content and/or the user profile. For example, customized video creator system 310 may generate, using a ML model (e.g., ML model 314), an audio for the animated background. For example, an animation background can utilize a series of audio tones/tunes tailored to a particular media content and/or user profile to pique user interest in the media content. In some cases, an audio of media content has a higher volume than an audio of the animated background.

In step 750, method 700 includes creating a customized video that includes the animated background, the one or more items, the audio, and the media content to stream on a user device. For example, customized video creator system 310 may provide the customized video (e.g., interstitials with animated background) to a user device for playback (e.g., display device 108, media device 106, user device, client device, etc.). As previously described, the customized video can be displayed, played, or presented, on a user device after a device boot, a device resume, or exiting the screensaver. In some examples, the customized video can be gated by campaign-level frequency capping and/or placement-level frequency capping via an advertisement server (e.g., content server(s) 120, system server(s) 126, etc.) or by user(s) 132, respectively.

Figure 8:
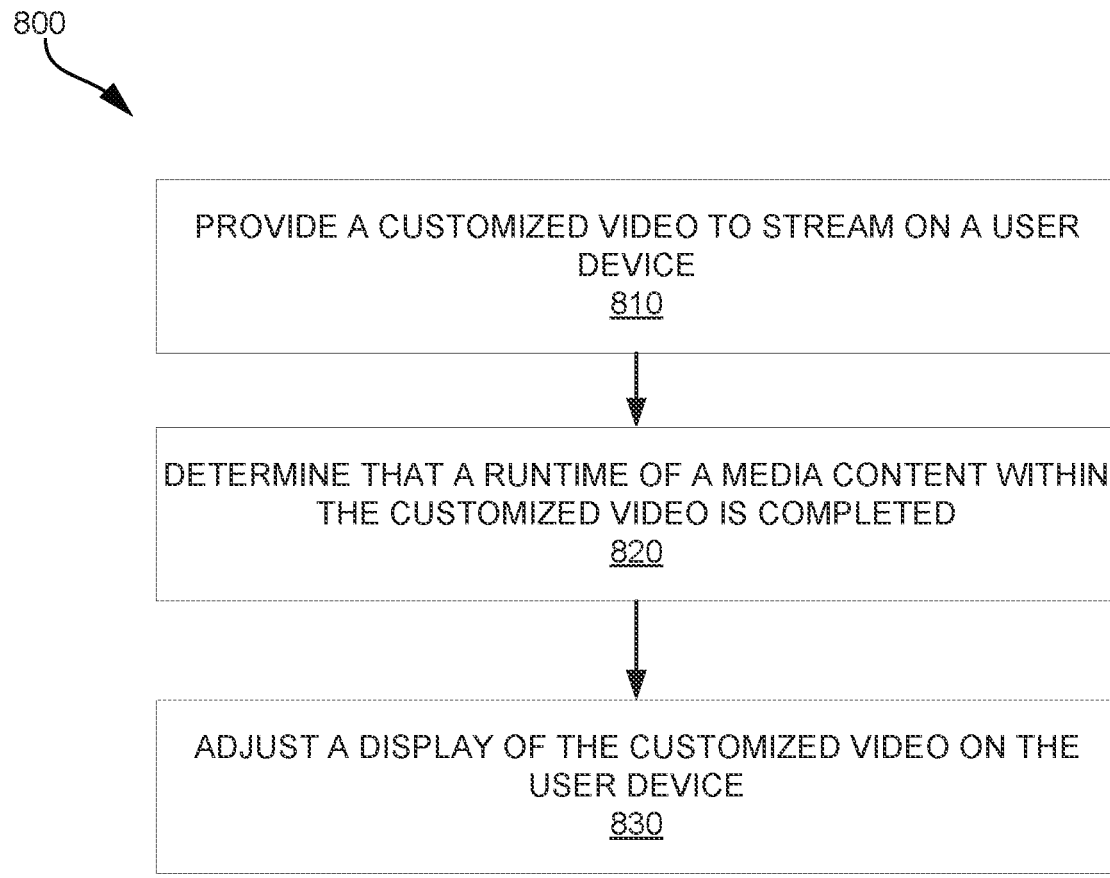
FIG. 8 illustrates a flowchart of an example method for providing an adjusted display of a customized video on a user device, according to some examples of the present disclosure.

FIG. 8 is a diagram illustrating a flowchart of an example method 800 for providing an adjusted display of a customized video on a user device, according to some examples of the present disclosure. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIG. 3. However, method 800 is not limited to that example.

In step 810, method 800 includes providing a customized video to stream on a user device. For example, customized video creator system 310 may provide customized video (e.g., output 320 that includes media content 302 with an animated background) to stream on a device associated with user 132.

In step 820, method 800 includes determining that a runtime of a media content within the customized video is completed. For example, customized video creator system 310 may determine that a runtime of media content 302 is completed or that a countdown timer (e.g., countdown timer 420 or 520) has reached zero or expired.

Figure 9:
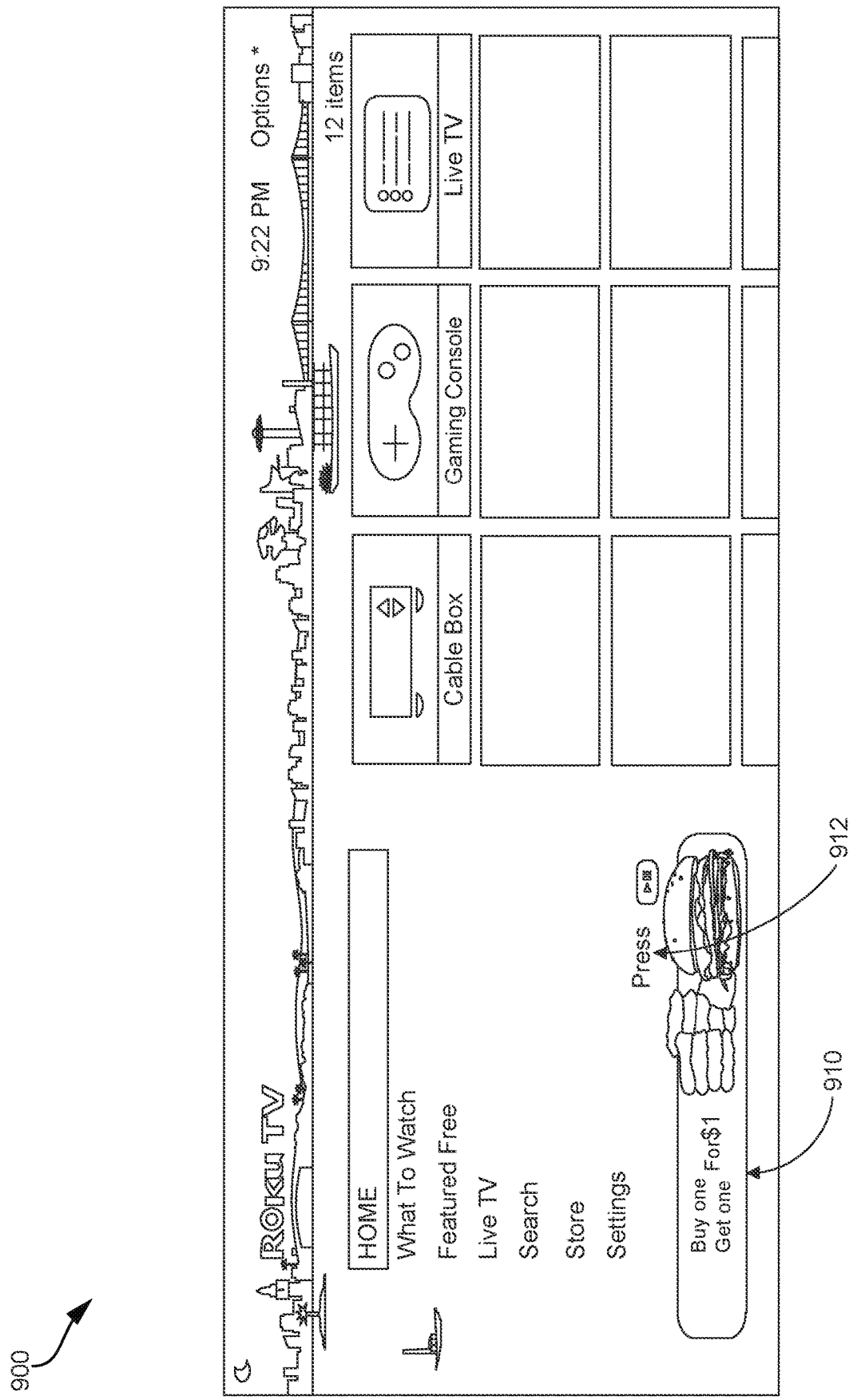
FIG. 9 is a diagram illustrating an example user interface with media content for playback, according to some examples of the present disclosure.

In step 830, method 800 includes adjusting a display of the customized video on the user device. For example, customized video creator system 310 may adjust a display of the customized video on the device associated with user 132 (e.g., settling to the bottom left or right corner of user interface when playing media content is completed). In other words, an interstitial unit (e.g., a combination of media content and an animated background) and a leave-behind banner unit can be tied to the same campaign flight as companion ads. Referring to FIG. 9, user interface 900 includes customized video or banner 910 in an adjusted size with playback button 912 such that a user 132 may click playback button 912 to replay media content with an animated background.

Similar to the animation sequence that can be personalized and amended to suit the user's taste and viewership profile (e.g., user profile), the same targeting and data dimensions can be used to refine the selection and subsequent rendering of the leave-behind banner. Additionally, the leave-behind banner can be optimized depending on the action the user may take in the interstitial unit. For example, if a user took action in the interstitial unit (e.g., used a QR code), then the leave-behind banner can show a different CTA (e.g., a coupon code). As follows, a user can see a different CTA if one was acted upon in the earlier part of the sequence. For other users, the same CTA may persist depending on the PO model scores as noted above.

Figure 10:
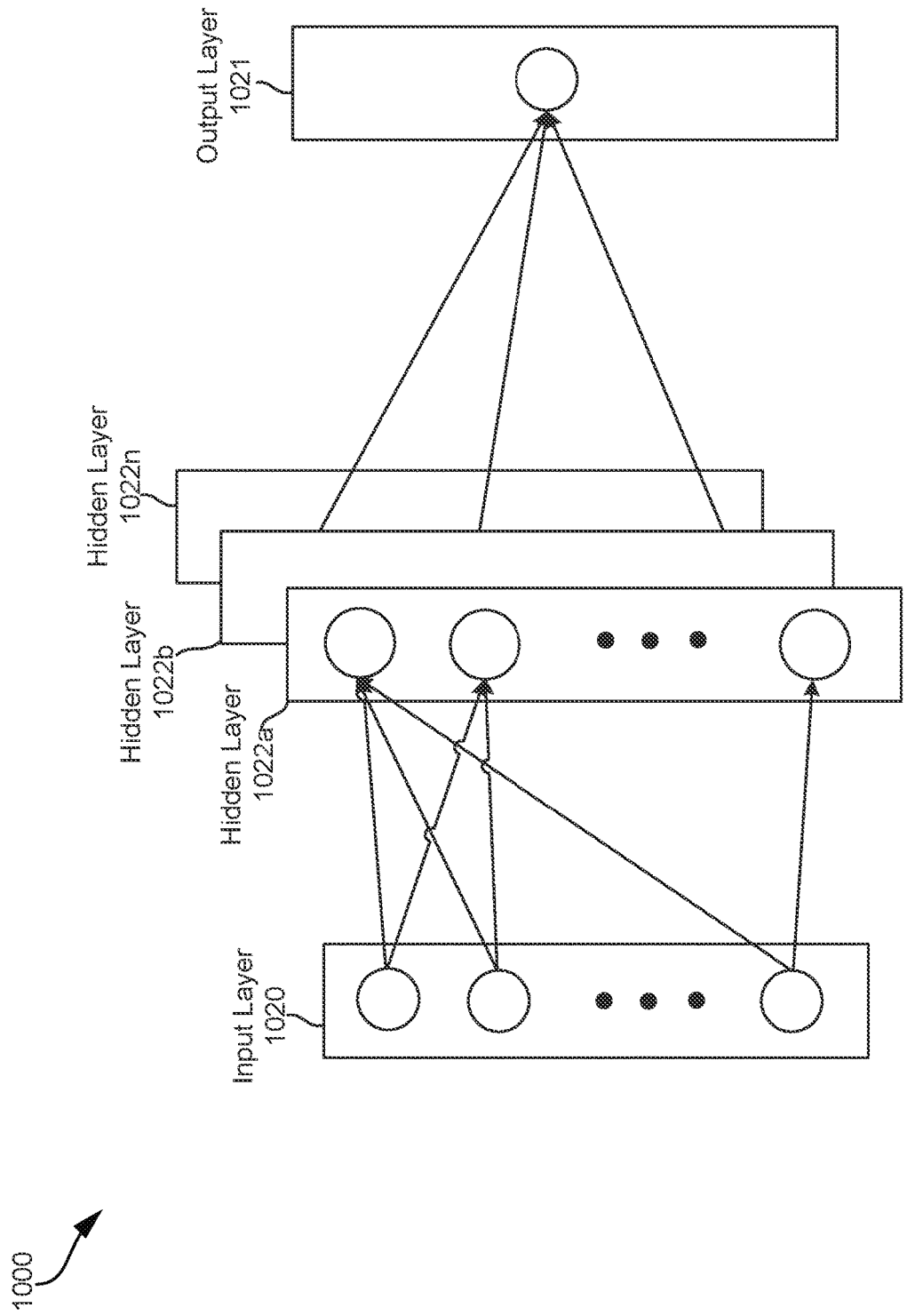
FIG. 10 is a diagram illustrating an example of a neural network architecture, according to some examples of the present disclosure.

FIG. 10 is a diagram illustrating an example of a neural network architecture 1000 that can be used to implement some or all of the neural networks described herein (e.g., ML model 314). The neural network architecture 1000 can include an input layer 1020 can be configured to receive and process data to generate one or more outputs. The neural network architecture 1000 also includes hidden layers 1022a, 1022b, through 1022n. The hidden layers 1022a, 1022b, through 1022n include "n" number of hidden layers, where "n" is an integer greater than or equal to one. The number of hidden layers can be made to include as many layers as needed for the given application. The neural network architecture 1000 further includes an output layer 1021 that provides an output resulting from the processing performed by the hidden layers 1022a, 1022b, through 1022n.

The neural network architecture 1000 is a multi-layer neural network of interconnected nodes. Each node can represent a piece of information. Information associated with the nodes is shared among the different layers and each layer retains information as information is processed. In some cases, the neural network architecture 1000 can include a feed-forward network, in which case there are no feedback connections where outputs of the network are fed back into itself. In some cases, the neural network architecture 1000 can include a recurrent neural network, which can have loops that allow information to be carried across nodes while reading in input.

Information can be exchanged between nodes through node-to-node interconnections between the various layers. Nodes of the input layer 1020 can activate a set of nodes in the first hidden layer 1022a. For example, as shown, each of the input nodes of the input layer 1020 is connected to each of the nodes of the first hidden layer 1022a. The nodes of the first hidden layer 1022a can transform the information of each input node by applying activation functions to the input node information. The information derived from the transformation can then be passed to and can activate the nodes of the next hidden layer 1022b, which can perform their own designated functions. Example functions include convolutional, up-sampling, data transformation, and/or any other suitable functions. The output of the hidden layer 1022b can then activate nodes of the next hidden layer, and so on. The output of the last hidden layer 1022n can activate one or more nodes of the output layer 1021, at which an output is provided. In some cases, while nodes in the neural network architecture 1000 are shown as having multiple output lines, a node can have a single output and all lines shown as being output from a node represent the same output value.

In some cases, each node or interconnection between nodes can have a weight that is a set of parameters derived from the training of the neural network architecture 1000. Once the neural network architecture 1000 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network architecture 1000 to be adaptive to inputs and able to learn as more and more data is processed.

The neural network architecture 1000 is pre-trained to process the features from the data in the input layer 1020 using the different hidden layers 1022a, 1022b, through 1022n in order to provide the output through the output layer 1021.

In some cases, the neural network architecture 1000 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network architecture 1000 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as $E\_total = \Sigma(½(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network architecture 1000 can perform a backward pass by determining which inputs (weights) most contributed to the loss of the network, and can adjust the weights so that the loss decreases and is eventually minimized.

The neural network architecture 1000 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network architecture 1000 can include any other deep network other than a CNN, such as an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 11:
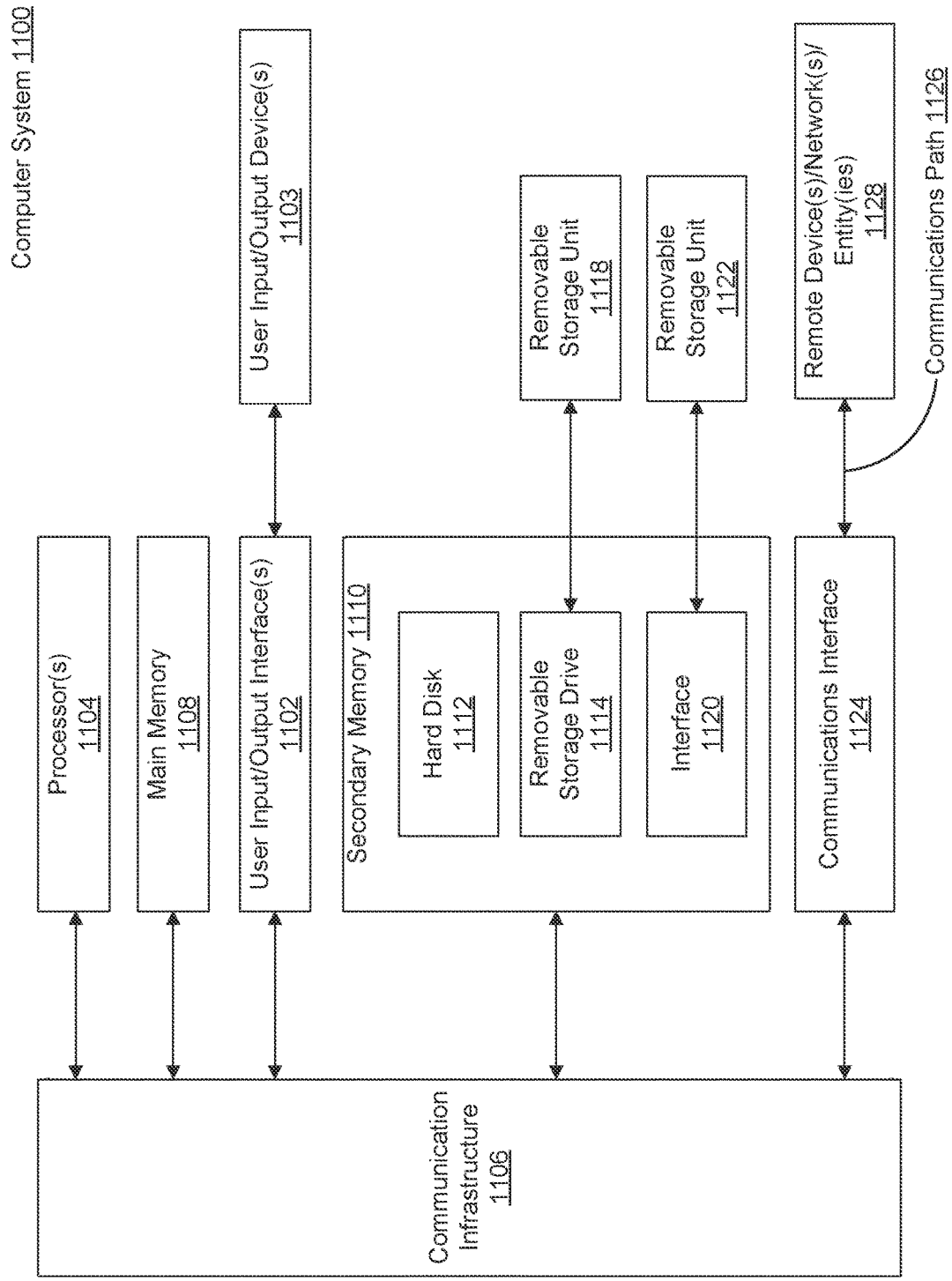
FIG. 11 illustrates an example computer system that can be used for implementing various aspects of the present disclosure.

Various aspects and examples may be implemented, for example, using one or more well-known computer systems, such as computer system 1100 shown in FIG. 11. For example, the media device 106 may be implemented using combinations or sub-combinations of computer system 1100. Also or alternatively, one or more computer systems 1100 may be used, for example, to implement any of the aspects and examples discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1100 may include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communications path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100 or processor(s) 1104), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: one or more memories; and at least one processor coupled to at least one of the one or more memories and configured to perform operations comprising: receiving media content, the media content comprising a sequence of video frames; determining a context associated with the media content; generating an animated background based on the context associated with the media content, wherein the animated background includes one or more items; and placing the media content within the animated background to generate a customized video for playback on a user device.

Aspect 2. The system of Aspect 1, wherein at least a portion of the animated background is generated using a machine learning model.

Aspect 3. The system of any of Aspects 1 or 2, wherein the context comprises a target user.

Aspect 4. The system of any of Aspects 1 to 3, wherein the context comprises a source identifier, wherein the source identifier identifies a brand or entity associated with the media content.

Aspect 5. The system of any of Aspects 1 to 4, wherein the context comprises a content provided in the sequence of video frames.

Aspect 6. The system of any of Aspects 1 to 5, wherein the media content comprises an advertisement.

Aspect 7. The system of any of Aspects 1 to 6, wherein the media content or the animated background displays a countdown timer.

Aspect 8. The system of any of Aspects 1 to 7, wherein the one or more items include at least one of a barcode, a call-to-action element, and a logo.

Aspect 9. The system of any of Aspects 1 to 8, wherein an audio of the media content has a higher volume than an audio of the animated background.

Aspect 10. The system of any of Aspects 1 to 9, wherein the at least one processor is configured to perform operations comprising: resizing a display of the media content within the animated background based on a point in time during playback of the media content.

Aspect 11. A method comprising: receiving media content, the media content comprising a sequence of video frames; determining a context associated with the media content; generating an animated background based on the context associated with the media content, wherein the animated background includes one or more items; and placing the media content within the animated background to generate a customized video for playback on a user device.

Aspect 12. The method of Aspect 11, wherein at least a portion of the animated background is generated using a machine learning model.

Aspect 13. The method of any of Aspects 11 or 12, wherein the context comprises a target user.

Aspect 14. The method of any of Aspects 11 to 13, wherein the context comprises a source identifier, wherein the source identifier identifies a brand or entity associated with the media content.

Aspect 15. The method of any of Aspects 11 to 14, wherein the context comprises a content provided in the sequence of video frames.

Aspect 16. The method of any of Aspects 11 to 15, wherein the media content comprises an advertisement.

Aspect 17. The method of any of Aspects 11 to 16, wherein the media content or the animated background displays a countdown timer.

Aspect 18. The method of any of Aspects 11 to 17, wherein the one or more items include at least one of a barcode, a call-to-action element, and a logo.

Aspect 19. The method of any of Aspects 11 to 18, further comprising: resizing a display of the media content within the animated background based on a point in time during playback of the media content.

Aspect 20. A non-transitory computer-readable medium having instructions stored thereon that, when executed by at least one computing device, cause the at least one computing device to perform a method according to any of Aspects 11 to 19.

Aspect 21. A system comprising means for performing a method according to any of Aspects 11 to 19.

Aspect 22. A computer program product having stored thereon instructions which, when executed by one or more processors, cause the one or more processors to perform a method according to any of Aspects 11 to 19.

What is claimed is:

1. A system comprising:
one or more memories; and
at least one processor coupled to at least one of the one or more memories and configured to perform operations comprising:
receiving media content, the media content comprising a sequence of video frames;
determining a context information associated with the media content, the context information identifying and characterizing one or more characteristics of an advertisement;
generating an animated background based on the context information associated with the media content, wherein the animated background includes one or more items associated with the context information; and
placing the media content within the animated background to generate a customized video for playback on a user device.

2. The system of claim 1, wherein at least a portion of the animated background is generated using a machine learning model.

3. The system of claim 1, wherein the context information comprises a target user.

4. The system of claim 1, wherein the context information comprises a source identifier, wherein the source identifier identifies a brand or entity associated with the media content.

5. The system of claim 1, wherein the context information comprises a content provided in the sequence of video frames.

6. The system of claim 1, wherein the one or more characteristics are associated with a product, a service, a brand, or any combination thereof.

7. The system of claim 1, wherein the media content or the animated background displays a countdown timer.

8. The system of claim 1, wherein the one or more items include at least one of a barcode, a call-to-action element, and a logo.

9. The system of claim 1, wherein an audio of the media content has a higher volume than an audio of the animated background.

10. The system of claim 1, wherein the at least one processor is configured to perform operations comprising:
resizing a display of the media content within the animated background based on a point in time during playback of the media content.

11. A method comprising:
receiving media content, the media content comprising a sequence of video frames;
determining a context information associated with the media content, the context information identifying and characterizing one or more characteristics of an advertisement;
generating an animated background based on the context information associated with the media content, wherein the animated background includes one or more items associated with the context information; and
placing the media content within the animated background to generate a customized video for playback on a user device.

12. The method of claim 11, wherein at least a portion of the animated background is generated using a machine learning model.

13. The method of claim 11, wherein the context information comprises a target user.

14. The method of claim 11, wherein the context information comprises a source identifier, wherein the source identifier identifies a brand or entity associated with the media content.

15. The method of claim 11, wherein the context information comprises a content provided in the sequence of video frames.

16. The method of claim 11, wherein the one or more characteristics are associated with a product, a service, or a brand, or any combination thereof.

17. The method of claim 11, wherein the media content or the animated background displays a countdown timer.

18. The method of claim 11, wherein the one or more items include at least one of a barcode, a call-to-action element, and a logo.

19. The method of claim 11, further comprising:
resizing a display of the media content within the animated background based on a point in time during playback of the media content.

20. A non-transitory computer-readable medium having instructions stored thereon that, when executed by at least one computing device, cause the at least one computing device to perform operations comprising:
receiving media content, the media content comprising a sequence of video frames;
determining a context information associated with the media content, the context information identifying and characterizing one or more characteristics of an advertisement;
generating an animated background based on the context information associated with the media content, wherein the animated background includes one or more items associated with the context information; and
placing the media content within the animated background to generate a customized video for playback on a user device.

* * * * *